July 3, 1956   D. L. KAUFMAN   2,752,760
EXPANSION VALVE WITH BULB CONTROL
Filed June 4, 1954   3 Sheets-Sheet 1

INVENTOR.
Daniel L. Kaufman
BY R R Candor
His Attorney

July 3, 1956
D. L. KAUFMAN
2,752,760
EXPANSION VALVE WITH BULB CONTROL
Filed June 4, 1954
3 Sheets-Sheet 2
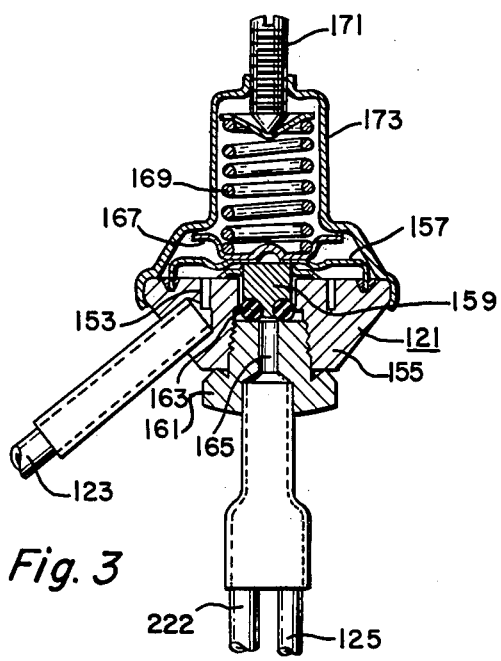
Fig. 3
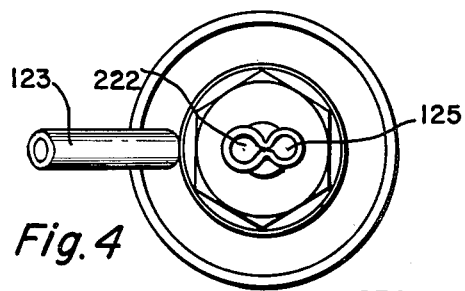
Fig. 4
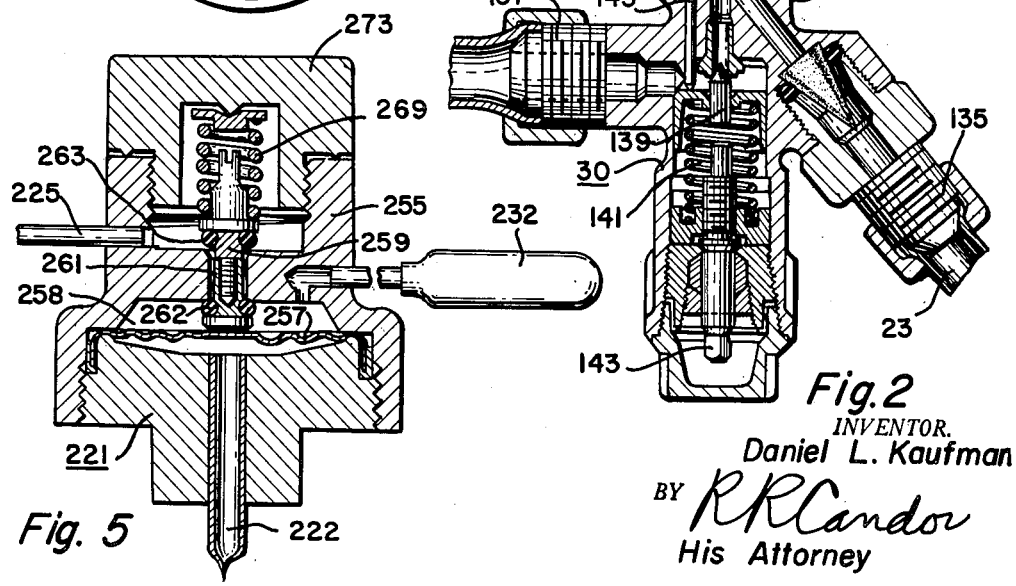
Fig. 5
Fig. 2
INVENTOR.
Daniel L. Kaufman
BY R R Candor
His Attorney July 3, 1956  D. L. KAUFMAN  2,752,760
EXPANSION VALVE WITH BULB CONTROL
Filed June 4, 1954  3 Sheets-Sheet 3

INVENTOR.
Daniel L. Kaufman
BY R. K. Candor
His Attorney 2,752,760
Patented July 3, 1956

2,752,760

EXPANSION VALVE WITH BULB CONTROL

Daniel L. Kaufman, Dayton, Ohio, assignor to General Motors Corporation, Detroit, Mich., a corporation of Delaware Application June 4, 1954, Serial No. 434,525

3 Claims. (Cl. 62—8)

This invention relates to refrigerating apparatus and more particularly to compression refrigerating systems for automobiles and other applications and the control of evaporator pressure and temperature in such systems.

Automobile air conditioning systems operate under extremely varied conditions and are subject to abnormally low evaporator pressure and temperature conditions under low loads. One of the reasons for this is that the compressor is ordinarily driven directly by the car engine at speeds proportional to the car speed while the air conditioning load primarily varies according to outside temperatures. The low evaporator pressures and temperatures occuring when the car speed is high and the air conditioning load is low causes frosting and icing of the evaporator thereby reducing the efficiency of the system.

It is an object of my invention to provide a simple control arrangement which will control the flow of refrigerant to the evaporator in such a way that the evaporator pressure and temperature will be kept within a satisfactory range and particularly be prevented from becoming frosted or iced.

It is another object of my invention to provide an additional control upon the thermostatic bulb of a thermostatic expansion valve which will prevent or reduce the flow of refrigerant into the evaporator as long as the evaporator temperature is abnormally low.

When an automobile is out in the sun for a considerable period of time, the refrigerating system in the car will become quite hot. This causes an abnormally high pressure within the evaporator. The ordinary thermostatic expansion valve will allow refrigerant to flow into the hot evaporator shortly after the compressor is started. This will keep the pressure within the evaporator so high that for a considerable period of time the evaporator temperature will not be low enough to produce effective refrigeration.

It is therefore still another object of my invention to provide a simple controlling arrangement which will prevent flow of refrigerant into the evaporator when the evaporator temperature is abnormally high.

It is another object of my invention to provide an additional control upon the thermostat bulb of a thermostatic expansion valve which will prevent the flow of refrigerant into the evaporator as long as the evaporator temperature is abnormally high.

These objects are attained by providing a pressure operated valve in the connection between the thermostatic bulb and the fluid motor of the thermostatic expansion valve. This pressure operated valve is responsive to pressure in the bulb connection to close the bulb connection on a predetermined low bulb pressure or upon either a predetermined low or predetermined high bulb pressure. The bulb is placed at the outlet of the evaporator and the remainder of the automotive air conditioning system or any other refrigerating system to which it is applied may be conventional.

Further objects and advantages of the present invention will be apparent from the following description, reference being had to the accompanying drawings, wherein a preferred form of the invention is clearly shown.

In the drawings:

Figure 2 is an enlarged view of the thermostatic expansion valve and the bulb system embodying my invention;

Figure 3 is an enlarged sectional view of the pressure operated valve located in the bulb connection;

Figure 4 is a bottom view of the valve shown in Figure 3;

Figure 5 is a sectional view of a modified form of valve;

Figure 1:
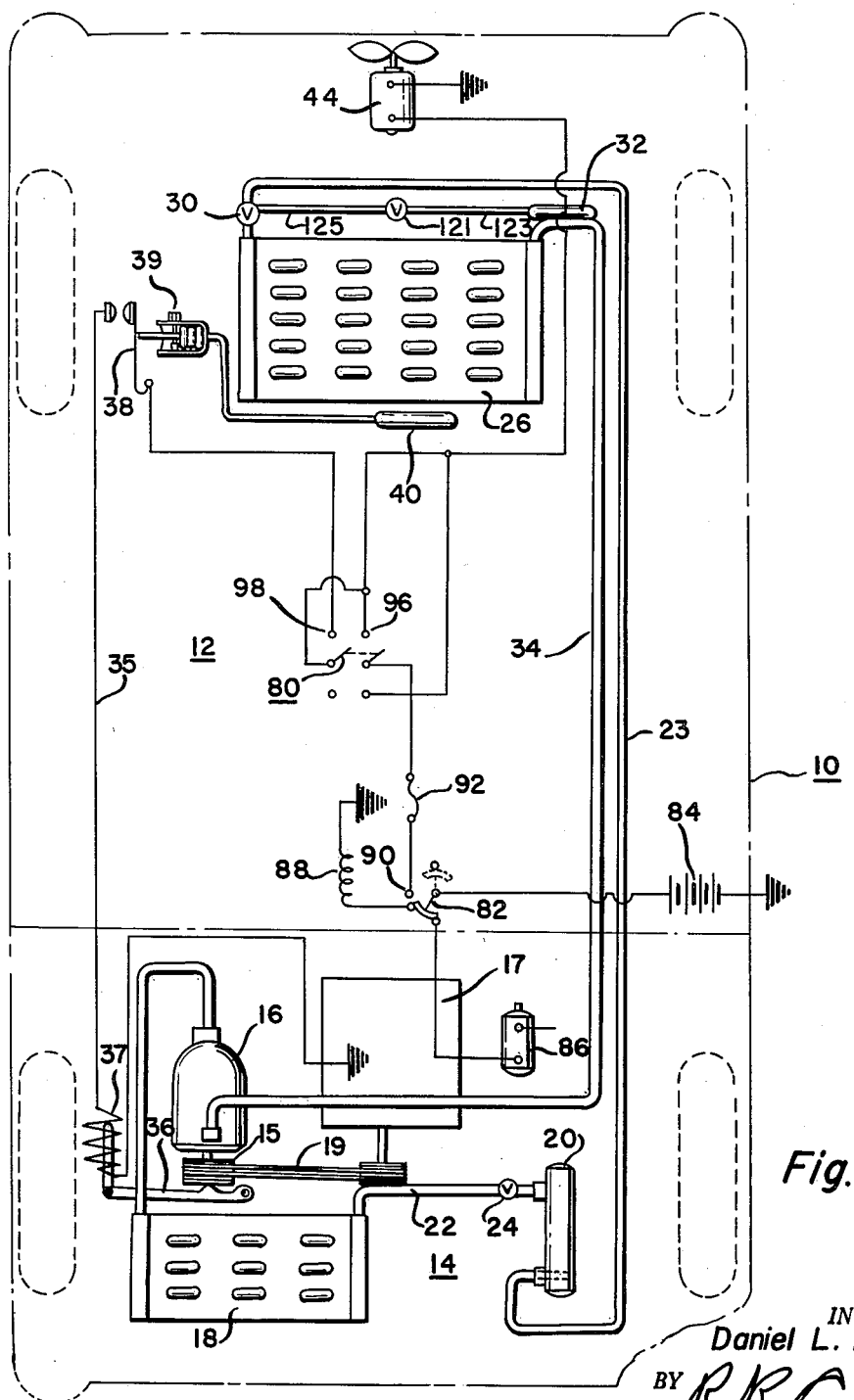
Figure 1 is a diagrammatic view of an automotive air conditioning system embodying one form of my invention.

Referring now more particularly to Figure 1 there is illustrated diagrammatically a conventional passenger automobile 10 provided with a passenger compartment 12 and an engine compartment 14. The air conditioning equipment used for supplying conditioned air to the passenger compartment of the car includes a compressor 16 provided with a clutch pulley 15 driven by the belt 19 from the main car engine 17. The compressor 16 discharges the compressed refrigerant into a condenser 18 which may be located in front of the engine radiator. The condensed refrigerant flows by gravity from the condenser through the refrigerant conduit 22 to a receiver 20 located below the condenser. The check valve 24 is provided in the conduit 22 to prevent any reverse flow of refrigerant from the receiver 20 to the condenser 18. The liquid refrigerant is conducted from the receiver 20 through a conduit 23 to a thermostatic expansion valve 30 located at the inlet to the evaporator 26. The vaporized refrigerant leaving the outlet of the evaporator 26 returns to the inlet of the compressor 16 through the suction conduit 34.

The clutch pulley 15 is normally disengaged so as to disconnect the compressor 16 from the engine 17. The clutch pulley 15 is moved into engaged position by a lever 36 operated by a solenoid 37 connected by a conductor 35 to a thermostatic switch 38 having a temperature responsive element 40 located in the return air stream flowing to the evaporator 26 from the passenger compartment 12. The switch 38 may be adjusted by the screw 39. The motor driven fan 44 draws air from the passenger compartment into contact with the bulb 40 and through the evaporator 26 before returning the cooled air to the passenger compartment 12.

The entire air conditioning system is under the control of the ignition switch 82 shown in the engine cranking position in Figure 1. In this position current is supplied from the battery 84 to the starter motor 86 and the ignition coil 88.

Upon the starting of the car engine 17, the ignition switch 82 will be rotated clockwise slightly to continue to close the circuit from the battery 84 to the ignition coil 88 but also to engage the contact 90 which connects through a fuse 92 to one portion of the master air conditioning control switch 80. The switch 80 is a double pole three position manually operated switch for controlling the air conditioning means including the clutch pulley 15. In the central or "off" position, in which the switch is shown in Figure 1, all refrigeration and air circulation is shut off so that no current can flow to either the motor driven fan 44 or the solenoid 37.

When it is merely desired to operate the blower without engaging the clutch pulley 15, the double throw switch 80 is moved toward the engine 17 so as to close the circuit to the motor driven fan 44 to provide air circulation without refrigeration.

When the switch 80 is moved to the opposite position away from the engine 17 the contacts 96 and 98 are engaged. The motor driven fan will then continue to operate as long as the ignition switch is in the "on" position. The solenoid 37 will be connected by the switch 80 to the battery 84 subject to the closing of the thermostatic air switch 38. The switch 38 may be set to close at some suitable temperature such as 80° F. and to open at a lower temperature such as 75° F. The screw 39 may be rotated to raise or lower both of these temperatures.

In this system as long as the switch 38 is closed and the car is in operation, the compressor 16 will be driven by the car motor 17 at speeds proportional to the car speed. The compressor must be built large enough to provide adequate cooling at the maximum temperature expected to be encountered such as 100° F. When the outside temperature is just above 80° the capacity of the compressor 16 will be much greater than is required for evaporation of the refrigerant from the evaporator 26 at the normal range of evaporator pressures and temperatures used in air conditioning. This will cause the temperature of the evaporator 26 to be lowered and also will reduce the amount of refrigerant in the evaporator as well as causing the reduction in flow of refrigerant through the valve 30 into the evaporator 26 because of the provision of the usual thermostatic bulb 32 upon the suction conduit 34 adjacent the outlet of the evaporator 26.

Figure 6:
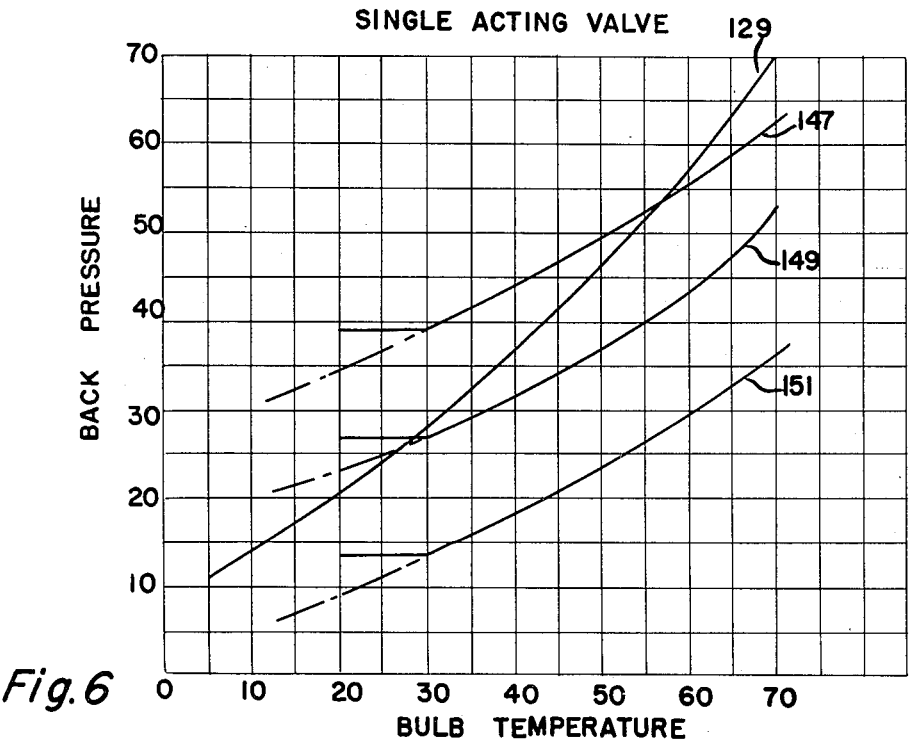
Figure 6 is a pressure temperature diagram for three different adjustments of the single acting valve together with a refrigerant curve.

According to my invention, to prevent this progressive lowering of the temperature of the evaporator 26 and the increasing reduction of the refrigerant flow into the evaporator 26 I provide a pressure responsive valve 121 in the conduits 123 and 125 connecting the thermostat bulb 32 with the fluid motor 127 of the valve 30. This prevents the lowering of the temperature of the evaporator 26 to the point of frosting or icing. Figure 6 includes a refrigerant curve 129 illustrating the reduction in temperature at the bulb 32 as the back pressure falls. This shows that as the back pressure falls below thirty pounds, the temperature at the bulb 32 will approach or fall below freezing. This causes moisture to be frozen out of the air in the form of ice or frost onto the surfaces of the evaporator 26. This reduces the efficiency and capacity of the evaporator and also reduces air flow through the evaporator.

The fluid motor 127 is formed by an external cap 131 and a metal bellows 133 within the cap 131. The space in between the bellows 133 and the cap 131 communicates through the tube 125, the valve 121 and the tube 123 with the interior of the bulb 32. Preferably the bulb 32 is filled with activated charcoal and the connecting system is charged with carbon dioxide at a pressure of about sixty-seven pounds at 60° F. However if desired, the bulb 32 and the connecting system may be charged with a suitable refrigerant providing somewhat similar properties, for example, the same refrigerant used in the refrigerating circuit, difluorodichloromethane.

The valve 30 is provided with an inlet connection 135 connecting to the liquid conduit 23 and an outlet connection 137 connecting with the evaporator inlet. The valve includes a valve needle 139 spring pressed to closed position by a coil spring 141 adjusted by the screw 143. The valve needle 139 is moved to open position by the downward movement of the bellows 133 transmitted by three pins 145, one of which is shown in Figure 2, to the valve needle 139. The outlet connection 137 communicates with the interior of the bellows 133 through the passages provided for the pins 145.

Thus as long as the new pressure valve 121 remains open, the increase in temperature of the bulb 32 will have the effect of moving the needle valve 139 to open position while an increase in pressure within the evaporator 26 will act on the interior of the bellows 133 to move the needle valve 139 toward closed position. As illustrated in Figure 6, the screw 143 may be adjusted to provide different pressure-temperature curves in the evaporator as illustrated by the curve designated by the reference characters 147, 149 and 151. If no valve 121 were provided and the compressor 16 withdrew evaporated refrigerant from the evaporator 26 faster than refrigerant was evaporated in the evaporator the pressure and temperature would be gradually reduced according to the dot and dash line continuance of the curves 147, 149 and 151. This would bring about the objectionable frosting and icing conditions.

According to my invention, the conduit 123 connects to a passage 153 in the valve body 155. The valve body 155 is provided with a simple diaphragm 157 extending over the inlet passage 153 and having the rim sealed in an annular soldering trough to the valve body 155. The central portion of the diaphragm 157 is provided with a valve element 159 received within a central aperture in the valve body 155. The valve body 155 receives a plug 161. The valve member 159 is provided with an annular groove containing a synthetic rubber ring 163 adapted to seat against the end of the plug 161 for the purpose of sealing the centrally located outlet passage 165 in the plug 161. This centrally located outlet passage 165 connects through the conduit 125 with the fluid motor 127. Above the diaphragm 157 is a spring retainer and diaphragm stop 167 which holds the lower end of a compression type coil spring 169 adjusted by the adjusting screw 171 which is threaded in the cap 173. The screw 171 is adjusted to determine the minimum pressure required to be produced at the bulb 32 before the pressure on the inside of the diaphragm 157 is sufficient to balance the force of the spring 169 to permit flow beneath the ring 163 to the conduit connection 125.

As a result of this, as long as the temperature of the bulb remains high, the evaporator and the expansion valve 30 will operate similar to any evaporator equipped with a conventional thermostatic expansion valve. However, when the minimum pressure is reached for which the valve 121 is adjusted, the spring 169 will move the diaphragm 157 and the valve element 159 toward the plug 161 until the ring 163 seals off communication between the bulb 32 and the fluid motor 127 by tightly engaging the plug 161 around the passage 165. This will cause the valve 30 to operate as an automatic expansion valve without the thermostatic feature as long as the temperature of the bulb is below the temperature corresponding to the pressure for which the valve 127 is set. This causes the curves 147, 149 and 151 to be normal down to a certain bulb temperature such as 30° and at all bulb temperatures below 30°, the back pressure will remain constant preventing any further fall in temperature of the evaporator 26. This in effect provides a low temperature cutoff of the valve 30 preventing the lowering of temperature. The location of the compressor 16 in the warm engine compartment 14 avoids any danger that liquid refrigerant will be drawn into the compressor 16.

In Figure 5 is shown a double acting valve 221 providing in addition a high temperature cutoff for the valve 30 but corresponding otherwise to the single acting valve shown in Figures 3 and 4. In this valve the diaphragm 257 is inverted relative to its valve member 259. The valve body 255 is provided with a connection from the diaphragm chamber 258 to the thermostat bulb 232. The opposite sides of the diaphragm 257 is connected to a charging tube 222 by which one side of the diaphr may be properly charged with a permanent gas. The valve body 255 is also provided with a connection 225 to the fluid motor 127 of the expansion valve 30. The valve member 259 is located in the outlet 261 of the diaphragm chamber 258. The valve member 259 is provided with synthetic rubber sealing rings 262 and 263 at its opposite ends providing the low and high temperature cutoffs. The valve member 259 is held against the diaphragm 257 by a coil spring 269 held in place by a cap 273 which closes the top of the valve body 255.

Figure 7:
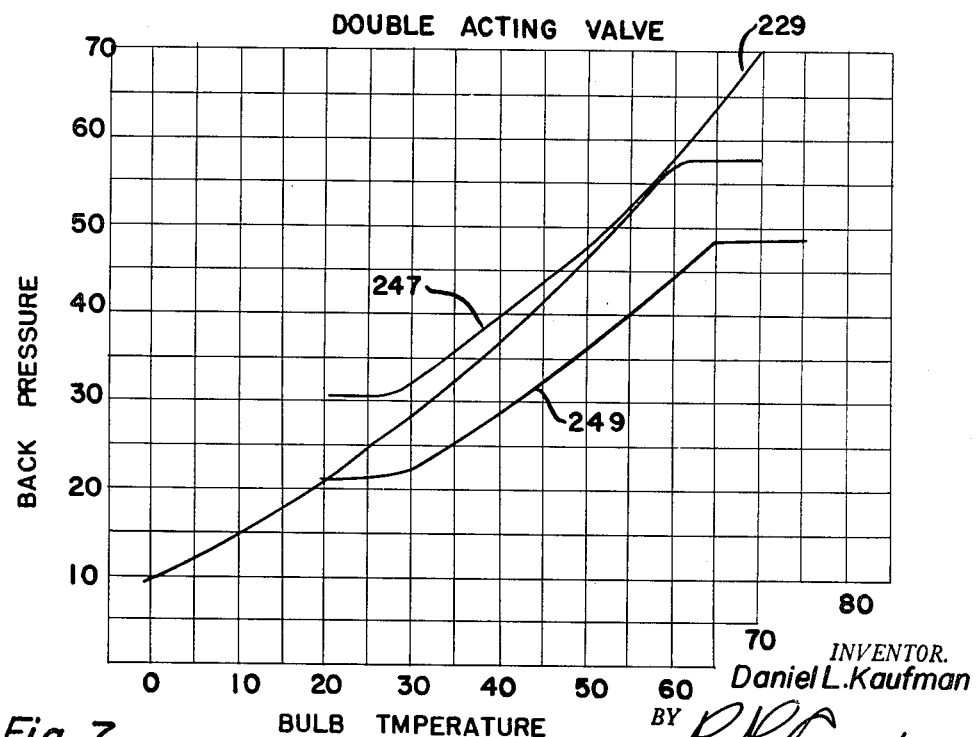
Figure 7 is a pressure temperature diagram for two different adjustments of the double acting valve together with a refrigerant curve.

As shown by the chart, Figure 7, there is shown a curve 229 illustrating the pressure temperature relationship of the refrigerant used in the system. Two curves 247 and 249 are shown illustrating the operation of the valve 30 in two different adjustments. The valve member 259 is moved to closed position upon either a predetermined high bulb temperature, such as between 55° and 60° F. for the high temperature cutoff, or a predetermined low bulb temperature, such as between 25° and 30° F. for the low temperature cutoff. This is illustrated by the flat portions at the upper and lower ends of the curves 247 and 249. Where the low temperature cutoff is not desired, the sealing ring 262 is omitted.

The purpose of the flat or constant back pressure portions illustrating the low pressure cutoff at the bottoms of these curves is already explained in connection with Figures 1 to 6. The constant back pressure portions at the upper ends of these curves 247 and 249 illustrate the high pressure cutoff for the prevention of liquid from entering the evaporator when the temperature of the bulb 232 is too high to produce effective refrigeration. Under such circumstances, the ring 263 moves into sealing engagement with the upper end of the valve passage 261 thereby sealing the bulb 232 from the fluid motor 127. The high pressure in the evaporator 26 due to high temperature conditions acts on the interior of the bellows 133 to keep the valve 30 closed as long as the back pressure is above the back pressure for which the screw 143 is set. This hastens the bringing down of the pressure in the evaporator 26 and the suction conduit 34 until the pressure reaches a point where effective refrigeration can be performed in the evaporator 26. As soon as this pressure is reached the temperature of the bulb 232 will be lowered sufficiently to permit opening of the valve member 259. This opening allows the pressure to be transmitted from the bulb 232 to the fluid motor 127 to open the valve and allow the valve 30 to operate according to the manner of a conventional thermostatic expansion valve. In this way cooling is obtained quicker. This particular feature is useful in many refrigerating systems in which the low temperature cutoff is objectionable and is omitted by omitting the sealing ring 262.

While the form of embodiment of the invention as herein disclosed constitutes a preferred form, it is to be understood that other forms might be adopted, as may come within the scope of the claims which follow.

What is claimed is as follows:

1. Refrigerating apparatus including a refrigerant circuit containing a compressor and a condenser and an evaporator, means for operating the compressor, a thermostatic expansion valve connected in said circuit between the condenser and evaporator, said valve having a fluid motor, a thermostat bulb in heat exchange relation with said circuit adjacent the outlet of said evaporator, conduit means connecting said bulb and said fluid motor, and pressure responsive valve connected in series with said conduit means and responsive to a predetermined pressure in said bulb for shutting off any flow of fluid in said conduit means.

2. Refrigerating apparatus including a refrigerant circuiting containing a compressor and a condenser and an evaporator, means for operating the compressor, a thermostatic expansion valve connected in said circuit between the condenser and evaporator, said valve having a fluid motor, a thermostat bulb in heat exchange relation with said circuit adjacent the outlet of said evaporator, conduit means connecting said bulb and said fluid motor, a pressure responsive valve device connected in series with said conduit means, said valve device having a pressure responsive actuating means exposed to the pressure in the portion of the conduit connecting with said bulb and responsive to a predetermined low pressure in said bulb, said valve device also having a valve element connected to and operated to closed position by said actuating means upon a predetermined low pressure in said bulb.

3. Refrigerating apparatus including a refrigerant circuit containing a compressor and a condenser and an evaporator, means for operating the compressor, a thermostatic expansion valve connected in said circuit between the condenser and evaporator, said valve having a fluid motor, a thermostat bulb in heat exchange relation with said circuit adjacent the outlet of said evaporator, conduit means connecting said bulb and said fluid motor, a pressure responsive valve device connected in series with said conduit means, said valve device having a pressure responsive actuating means exposed to the pressure in the portion of the conduit connecting with said bulb, said valve device also having double acting valve arrangement connected to and operated to closed position by said actuating means upon predetermined movement in either direction.

References Cited in the file of this patent

UNITED STATES PATENTS

| | | |
|---|---|---|
| 2,221,633 | Dasher | Nov. 12, 1940 |
| 2,538,861 | Carter | Jan. 23, 1951 |
| 2,579,034 | Dube | Dec. 18, 1951 |